Sept. 1, 1959 C. IMERSHEIN 2,902,165
FILTER LEAF AND METHOD OF ASSEMBLING IT
Filed March 4, 1957
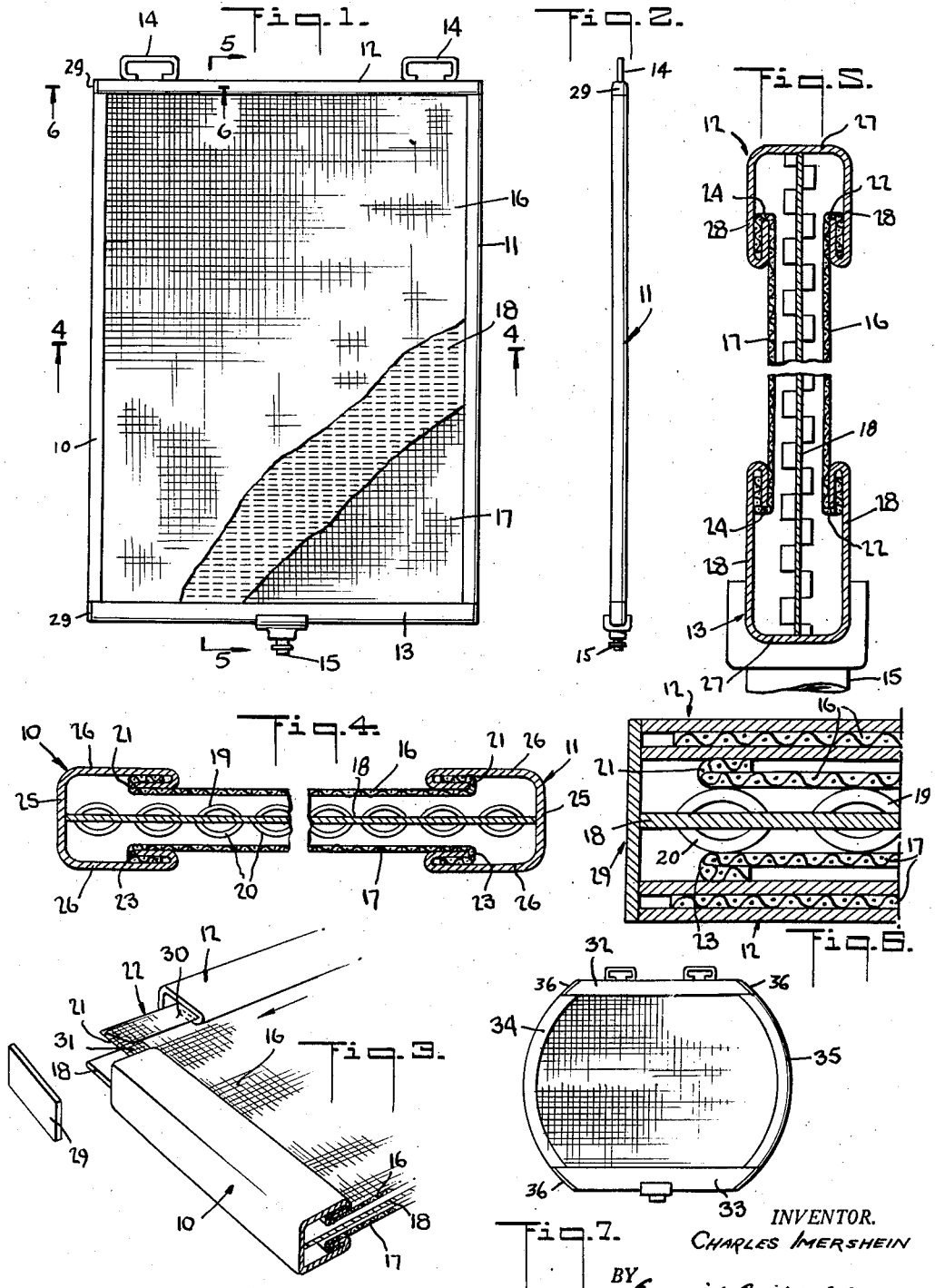
INVENTOR.
CHARLES IMERSHEIN
BY Frederick Breitenfeld
ATTORNEY

United States Patent Office 2,902,165
Patented Sept. 1, 1959

2,902,165

FILTER LEAF AND METHOD OF ASSEMBLING IT

Charles Imershein, Valley Stream, N.Y., assignor to Multi-Metal Wire Cloth Co., Inc., New York, N.Y., a corporation of New York Application March 4, 1957, Serial No. 643,581

5 Claims. (Cl. 210—486)

The present invention relates generally to filtration, and has particular reference to an improved filter leaf and to its method of manufacture and assembly.

A common type of filter leaf, employed in industrial filters, consists essentially of a pair of spaced filtering sheets (composed, for example, of woven metal cloth) defining the opposite walls of an enclosed space or chamber. Usually this chamber is defined by a corrugated or otherwise distorted element of rigid material such as metal, and the assembly is completed by a marginal frame establishing a liquid-tight condition which compels a liquid to be filtered to flow through the filter screens as it passes from the outside of the filter leaf to the enclosed chamber, thence to a collecting reservoir for the filtrate. Obviously, during this flow of liquid, the solids to be filtered from the liquid are deposited upon the outer surfaces of the filter screens. Usually filter leaves of this kind are mounted in a bank, side by side, within a substantially larger vessel into which the liquid to be filtered is introduced. At periodic intervals the filter leaves are removed from this vessel, and the deposited filtered material scraped away or otherwise disposed of.

In many instances of use, the best filtering is achieved when the filter cloths are tensioned, and held in taut condition. Heretofore the achievement of the desired result has involved the necessity for relatively complicated apparatus designed especially to create a tension in the filter cloth prior to its assembly into the filter leaf construction. This is relatively expensive and time-consuming, and the procedure imposes limitations upon the manufacturing process.

It is a general object of this invention to overcome these shortcomings of prior manufacturing procedures, and to produce a filter leaf assembly at much lower cost and in far less time, the filtering sheets being automatically tautened to the desired degree during the assembling operation, and the completed assembly being of a character that maintains the filtering layers in tensioned condition.

In the improved assembly of filter leaf elements, at least one pair of opposite margins of each filter screen are outwardly folded back, and the marginal frame strips that engage the assembly along these margins are of such shape that they interengage with the folded-back screen margins. This interlocking of parts is not by itself of novel character, but the improved assembly and mode of procedure involve features of novelty that automatically bring about and retain a tensioning of the filter screens. One of these features lies in the special dimensioning and arrangement of the parts so that the intermediate chambered element is of such length and width that it projects beyond the lines of fold-back on all sides. At the same time, the marginal frame strips are of such shape and dimensions that when the parts are brought together a force-fitted interlock is brought about in which each frame strip is pushed outwardly by the rigid intermediate element and pulled inwardly by the engaged screen or screens.

The improved construction lends itself most readily to the provision of filter leaves of four-sided nature, but the invention is not necessarily restricted to this particular polygonal shape. A special advantage of the improved construction lies in the fact that one or more of the sides of the filter leaf can be curved along a circular arc. This is of advantage in imparting maximum filtering surface area to the filter leaf where, as is commonly the case, the vessel into which the filter leaf is placed is of circular cross-section.

These general objects and advantages, and such other objects and advantages as may hereinafter appear or be pointed out, are achieved as indicated in the accompanying drawings, in which—

Fig. 1 is a face view of an illustrative filter leaf assembly constructed in accordance with this invention, certain parts having been broken away to reveal others that lie behind;

Fig. 2 is an edge view of Fig. 1;

Fig. 3 is a fragmentary perspective view illustrating a step of the assembly procedure;

Fig. 4 is an enlarged cross-sectional view along the line 4—4 of Fig. 1;

Fig. 5 is an enlarged cross-sectional view along the line 5—5 of Fig. 1;

Fig. 6 is a fragmentary enlarged cross-sectional view along the line 6—6 of Fig. 1; and Fig. 7 is a view similar to Fig. 1 illustrating a modified shape of filter leaf.

The filter leaf shown in Fig. 1 is of substantially rectangular shape, having a pair of opposite parallel side edges 10, 11 and a pair of parallel top and bottom edges 12, 13. Along the upper edge 12 the filter leaf may be provided with one or more handles or supporting members 14, and at the bottom the construction may be provided with a conduit connection 15 which communicates with the interior chamber of the filter leaf and may be connected to a manifold in which filtrate is collected from a multiple number of filter leaves.

The body of the assembly is of layered character, comprising a pair of spaced filter cloths or sheets 16, 17, and an intermediate rigid element of chambered character, designated 18.

The sandwiched element 18 may be constructed in various ways to serve as a spacer between the filter sheets 16 and 17 and to provide, at the same time, a hollow space or chamber within which filtrate may collect. In the illustrated embodiment of the invention the rigid element 18 has been shown in the form of a metal sheet having a multiplicity of loops or arches struck-up in one lateral direction, as shown at 19, and a multiplicity of similar struck-up portions 20 extending in the opposite lateral direction. Various structural expedients other than this may be employed to accomplish the same result.

Each of the filter cloths 16, 17 has turned-back margins. Thus, the side edges of the sheet 16 are folded back along lines 21 (see Fig. 4) while the top and bottom margins are turned back along lines 22 (Fig. 5). Similarly, the side edges of the filter cloth 17 are folded back in an outward direction along the lines 23 (Fig. 4) while the top and bottom margins are similarly folded back along lines 24 (Fig. 5). At the corners, the folded-back margins may overlap slightly, as best indicated in Fig. 3.

Of primary importance is the circumstance that the intermediate rigid element 18 is of such dimensions that it projects beyond the lines of fold-back by a predetermined amount on all sides.

The marginal parts of the assembly, referred to by the reference numerals 10–13 inclusive, are formed of separate rigid frame strips that engage the layered assembly along its edges. Each frame strip is of U-shaped cross-section defining a U-base and parallel U-arms. In Fig. 4, for example, it will be observed that each of the frame strips 10 and 11 has a base 25 and arms 26. Similarly, the frame strips 12 and 13 best shown in Fig. 5 have each a U-base 27 and U-arms 28. It will be observed that the arms 28 of the frame strip 13 are somewhat longer than those of the other frame strips, but this is not essential, merely preferable along the marginal edge to which the pipe connection 15 is established.

Each of the parallel U-arms of each frame strip has an inturned end, as is best indicated in Figs. 4 and 5, and these inturned ends are adapted to interengage with the adjacent folded-back screen margins. In accordance with the invention, the dimensions of the parts are such that a force-fitted interlock exists along each side, each U-base bearing against the corresponding edge of the rigid intermediate element 18, while the U-arms are under tension and thus impart tautness to the screens they engage.

In assembling the filter leaf, the two screens 16 and 17 are first provided, each being preferably composed of woven metal strands, and each having its margins folded back as hereinbefore described. A relatively rigid chambered element such as that shown at 18 is also provided, of a length and width greater than the corresponding length and width of the screens. These elements are laid upon each other with the folded-back screen margins directed outward, and with the edge portions of the intermediate element projecting beyond the lines of fold-back on each side. One of the marginal frame strips, for example, the strip 13, is then applied endwise to the corresponding marginal part of the layered assembly, the inturned ends of the arms of the frame strip being caused to interengage with the adjacent outwardly-turned margins of the two screen elements. The other frame strips are then applied in similar fashion, in succession. For example, the side strip 10 may be applied in an endwise direction until its lower end (as viewed in Fig. 1) comes into abutment with the end part of the strip 13. Then the strips 11 and 12 are similarly applied, but in each case somewhat more effort might be required in force-fitting the frame strip into final position, because it is during the application of these frame strips that the screen sheets are brought under tension. As a final step, or series of steps, the open ends of the frame strips 12 and 13 are sealed off by applying a suitably-shaped closure piece, such as the element shown at 29 in Fig. 3. This element may be of metal, and its application to the filter leaf unit may be achieved by welding.

In Fig. 6 I have represented on an enlarged scale the relative positions of the several parts at the corner indicated in Fig. 3, after the final adjustment of the frame strip 12 and the application of the closure piece 29. It is to be observed that the inturned end of the U-arm that engages beneath the folded-back margin 30 of the screen 16 (see Figs. 3 and 6) squeezes itself between the marginal part 30 and the corresponding marginal part 31 folded back at 21. This assures a tight joint. A similar relationship of parts exists on the opposite side of the filter leaf, as indicated in the lower part of Fig. 6; and this interengagement of the elements is of similar character at the other corners of the filter leaf.

In Fig. 7 I have shown the possibility of adapting the features of this invention to a filter leaf that is not strictly rectangular. In the construction shown in Fig. 7, the frame strips 32 and 33 are substantially parallel, defining the upper and lower margins of the filter leaf, but the frame strips 34 and 35 along the opposite sides of the filter leaf are curved. Each of these strips has a cross-sectional configuration similar to that shown in Figs. 3–6, and the frame strip as a whole conforms to the arc of a circle. Preferably, the strips 34 and 35 conform to arcs of a single circle, as indicated in Fig. 7, this circle being concentric with the curvature of the vessel within which the filter leaf shown, along with others arranged in parallel relation, are mounted.

The mode of assembling the filter leaf of Fig. 7 is the same as that hereinbefore described, except that the opposite ends of each frame strip are angular with respect to the longitudinal axis of the frame strip. The closure pieces 36 correspond to the closure piece indicated at 29. The same tensioning effect is created upon the filter layers as in the embodiment shown in Figs. 1–6, inasmuch as the intermediate element of Fig. 7 (not shown) has a shape corresponding to the shape of the filter sheets, and has dimensions which allow its edge portions to project beyond the corresponding folded-back margins of the outer screen sheets. Thus, a force-fitted interlock is created along the margins of the filter leaf, maintaining a tensioned condition in the screen elements.

From the description given it will be obvious that the filter leaf construction is relatively simple from a mechanical standpoint, low in cost from a manufacturing point of view, and reliably effective in performing the desired filtering action. No special apparatus or procedure is needed to impart tension to the filter cloths, and by properly designing and dimensioning the several parts, the mere act of bringing them into assembled relation is sufficient to impart the desired tension in the filter sheets, and to maintain it.

In general, it will be understood that the details herein described and illustrated may be modified by those skilled in the art without necessarily departing from the spirit and scope of the invention as expressed in the appended claims.

Having thus described my invention and illustrated its use, what I claim as new and desire to secure by Letters Patent is:

1. A method of assembling a filter leaf of the character described, which consists in providing a pair of four-sided metal-fabric screens, folding back the margins of said screens, providing a rigid correspondingly shaped element of chambered character whose length and width are greater than the corresponding lengths and widths of said screens, assembling said screens and chambered element to sandwich the latter between the screens with the folded-back screen margins outward and with the edge portions of the chambered element projecting beyond the lines of fold-back on each side, providing an open-ended frame strip for each side, each strip having a U-shaped cross-section and inturned ends on the U-arms, successively sliding said frame strips in endwise direction into engagement with the previously assembled screens and element to interlock the U-arms of each strip with the corresponding turned-back screen margins and to force-fit the U-base against the corresponding edge of the chambered element, whereby the screens become taut during the completion of the assembly, and finally sealing off the open ends of said frame strips.

2. In a filter leaf, a pair of metal-fabric screens arranged in sandwiching relation to a rigid intermediate element of chambered character, at least one pair of opposite margins of each screen being outwardly folded back, and rigid marginal frame strips engaging the assembly along said opposite margins, each strip being of U-shaped cross-section defining a U-base and parallel U-arms, the U-arms having inturned ends adapted to interengage with the adjacent folded-back screen margins, said intermediate element being of such length that it projects beyond the lines of fold-back of the screens and presses against said U-bases to create an interlock in which each U-base bears against the corresponding edge of the intermediate element while the U-arms impart tautness to the screens engaged thereby.

3. In a filter leaf, a pair of four-sided metal-fabric screens arranged in sandwiching relation to a correspondingly shaped rigid intermediate element of chambered character, the margins of each screen being outwardly folded back, and rigid marginal frame strips engaging the assembly, there being one frame strip for each of the four sides, each strip being of U-shaped cross-section defining a U-base and parallel U-arms, the U-arms having inturned ends adapted to interengage with the adjacent folded-back screen margins, said intermediate element being of such length and width that it projects beyond the lines of fold-back of the screens and presses against said U-bases on all four sides of the assembly to create an interlock in which each U-base bears against the corresponding edge of the intermediate element while the U-arms impart tautness to the screens engaged thereby.

4. In a filter leaf, the structure defined in claim 3 in which at least one side of the assembly is curved to conform to an arc of a circle.

5. In a filter leaf, the structure defined in claim 3 in which each of a pair of opposite sides of the assembly is convexly curved, the curves conforming to arcs of a single circle.

References Cited in the file of this patent

UNITED STATES PATENTS

| | | |
|---|---|---|
| 445,223 | Knight | Jan. 27, 1891 |
| 1,125,762 | Sturtevant | Jan. 19, 1915 |
| 1,240,385 | Sweetland | Sept. 18, 1917 |
| 1,323,421 | Sweetland | Dec. 2, 1919 |
| 1,982,924 | Norquist | Dec. 4, 1919 |
| 2,104,473 | Watson | Jan. 4, 1938 |
| 2,263,853 | Re Qua | Nov. 25, 1941 |
| 2,798,614 | Alexander | July 9, 1957 |